July 11, 1961     S. T. WILLIAMS     2,991,821

TIRE VALVE FOR COMPARTMENTED TIRES

Filed May 20, 1959

INVENTOR
SELDEN T. WILLIAMS
BY
*Byerly, Townsend, Watson & Churchill*
ATTORNEYS.

United States Patent Office 2,991,821
Patented July 11, 1961

2,991,821
TIRE VALVE FOR COMPARTMENTED TIRES

Selden T. Williams, Middlebury, Conn., assignor to Scovill Manufacturing Company, Waterbury, Conn., a corporation of Connecticut
Filed May 20, 1959, Ser. No. 814,585
6 Claims. (Cl. 152—427)

The present invention relates to a tire valve for compartmented pneumatic tires of the type having two chambers, one within the other, for example, a tubeless tire casing provided with an auxiliary safety tube, and wherein the respective compartments or chambers of the tire do not have any interconnecting air passage therebetween and are separately inflatable. In such tires the air pressure in the casing normally supports the load while the auxiliary safety tube is collapsed within the casing. In the event of a puncture in the casing, the offending object is removed and the collapsed tube is then inflated from a pressure source such as a $CO_2$ cartridge or a compressed air source. Because of the independency of the chambers, a separate tire valve had to be provided for inflating each chamber with the concomitant additional expense, inconvenience and time required for mounting the separate tire valves. It has been also proposed to provide a single tire valve structure whereby both chambers could be separately inflated, but such proposals were generally objectionable because they were complicated, costly to install and gave rise to leakage.

Among the objects of the present invention are to overcome the objectionable characteristics in prior tire valve constructions for compartmented tires and to provide a simple, efficient tire valve which when connected to an auxiliary safety tube and mounted on a rim for a tubeless tire can be selectively adjusted so that either chamber may be inflated, deflated and gauged in a conventional manner.

The foregoing and other objects of the invention, not specifically enumerated, are accomplished by providing a tubular spud or housing and a tubular valve stem slidably adjustable within the spud, the spud having means at the inner end portion thereof for attaching it to a safety tube and for securing it through an opening in a wheel rim to provide a leak-tight seal therewith, said spud having ports in axial spaced relation leading from its bore, the valve stem having a port leading from its bore, means for axially positioning the valve stem in the spud for selectively establishing fluid communication between the port in the valve stem and the ports in the spud and packing means between the valve stem and the spud to insure a fluid-tight seal therebetween.

The invention will be understood from the detailed description which follows when considered in connection with the accompanying drawing which illustrates a preferred embodiment and wherein.

Figure 1:
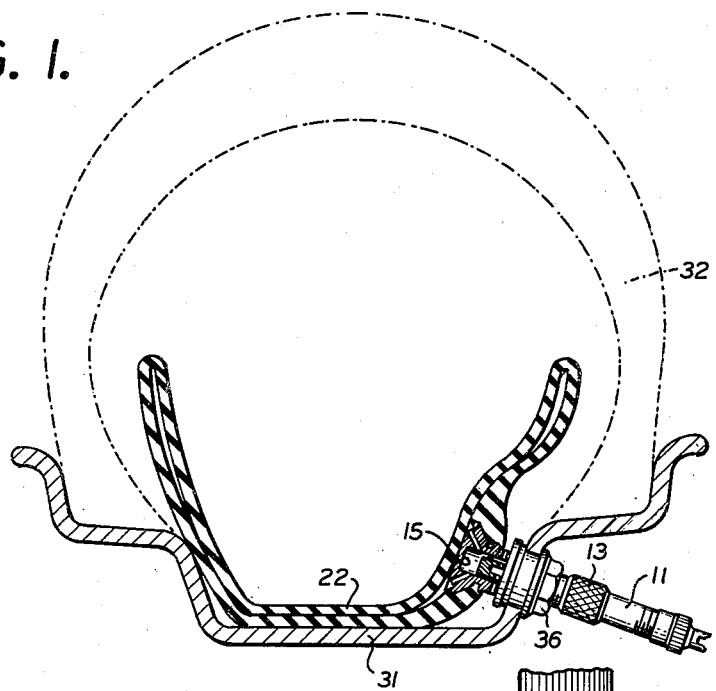
FIG. 1 is an elevational view of a tire valve embodying the present invention in its operational relation to a compartmented tire mounted on a wheel rim.

Referring to the drawing, the essential parts of the tire valve constituting the present invention are a tubular spud or housing 10 within which is adjustable slidably a tubular stem 11 by means of a spacer sleeve 12 and a shouldered clamping nut 13.

The tubular spud 10 has a cylindrical bore 14 of uniform diameter which is closed at its inner end 15 and leading from said bore adjacent said inner end are axially spaced ports 16 and 17. Preferably there are two diametrically spaced ports 16 and two diametrically spaced ports 17, although any number of said respective ports may be employed. For the major portion of its length the spud is externally screw-threaded as shown at 18 and is formed at its inner end with an enlarged base or foot 19 to which is bonded a conical rubber disc or patch 20, to the flat base 21 of which an inflatable tube 22 is adapted to be bonded so that the ports 17 will overlie the conventional valve opening in the inflatable tube. At the juncture of enlarged base 19 with the threaded portion 18 there is provided a shoulder 23 for a purpose which will be made apparent. At its outer end the bore 14 is broached or enlarged as shown at 24 to provide a shoulder 25.

Figures 2, 3:
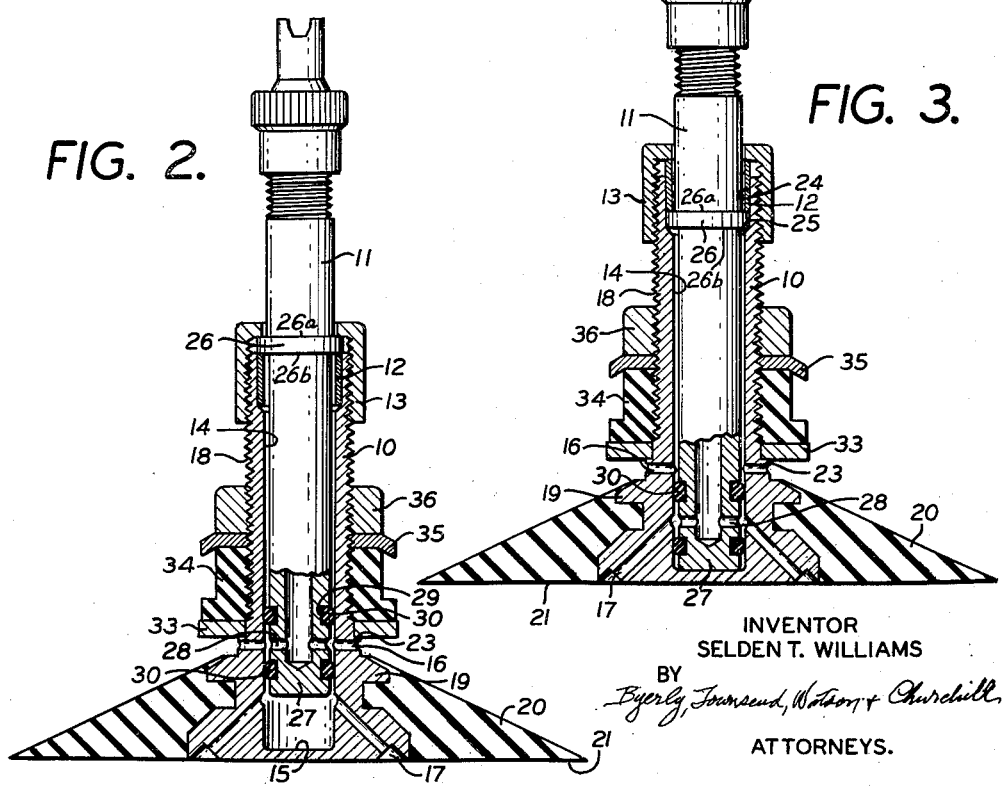
FIG. 2 is a diametrical section of the tire valve of the present invention with the major portion of the stem in elevation and showing the parts in relation to inflate a tubeless tire casing.
FIG. 3 is a view similar to FIG. 2 with the parts in relation to inflate an auxiliary safety tube.

The tubular stem 11 is of generally uniform diameter slightly less than the bore diameter of the spud and is formed intermediate its ends with a peripheral rib or flange 26 having a diameter to snugly fit within the broached bore portion 24 as shown in FIG. 3. The rib or flange 26 provides the stem 11 with opposed shoulders 26a and 26b. At its inner end the stem 11 is closed as shown at 27 and rearwardly of said closed end is formed with diametrically opposed ports 28. To provide a fluid-tight seal between the spud 10 and the stem 11 the latter is formed in axially spaced relation to either side of the ports 28 with an annular groove 29 within which is disposed an O-ring 30 having an outer diameter to engage the wall of the bore 14 in the spud. Mounted within the outer end of the bore in the stem 11 is a conventional valve insides or core (not shown) and the outer end of the stem is externally threaded and provided with a removable valve cap.

The spacer sleeve 12 has an outer diameter to seat within the broached bore portion 24, an inner diameter slightly larger than the outer diameter of the stem 11 and a length substantially equal to the length of the broached portion 24. It is to be noted that the length of the sleeve 12 is substantially equal to the axial distance between the ports 16 and 17 in the spud.

The tire valve with an inflatable tube 22 bonded to the rubber patch 20 may be mounted on a wheel rim 31 within a tubeless tire 32 shown in phantom in FIG. 1. To insure a leak-tight seal between the tire valve and the rim any suitable means may be provided and as herein show such means consist of a washer 33 of larger diameter than the valve stem hole in the rim seated on the shoulder 23, a shoulder rubber grommet 34 engaging over the spud and seating on said washer and having a diameter to snugly pass through the valve stem hole in the rim, a ring washer 35 engaging the outer end of the grommet and a clamping nut 36 engaging the external screw-threads 18 of the spud. With the securing means thus described it will be apparent that the valve stem with the washer 33 and grommet 34 positioned thereon may be inserted through the valve stem hole in the rim and the washer 35 and clamping nut 36 then positioned over the spud and clamped down so that the grommet will be deformed to fill the valve stem opening in the rim to provide a leak-tight seal between the spud and the rim.

With the tire valve and its fittings mounted as described in the preceding paragraph and with the spud and stem in the relationship shown in FIGS. 1 and 2 it will be apparent that air under pressure when charged through the stem 11 will enter the cashing 32 but not the auxiliary tube 22 to normally support the load to which the tire is subjected. In the event of a puncture, the offending object is removed, the nut 13 and stem 11 are removed from the spud and the spacer sleeve 12 is then removed. The stem 11 is then reinserted in the spud so that the peripheral rib or flange 26 will seat on the shoulder 25, the spacer sleeve 12 is then positioned over the stem to engage the shoulder 26a on the rib 26 and the nut 13 is again positioned to hold the parts in assembled relation. When this is done the tire valve parts will be in the relationship shown in FIG. 3 with the ports 28 in the stem in communication with the ports 17 in the spud whereupon the tube 22 may be inflated within the tire casing from a source of air under pressure or from a $CO_2$ cartridge to support the load to which the tire is subjected.

From the foregoing detailed description it will be apparent that with the tire valve of the present invention a puncture in the tire casing can be remedied in a comparatively short time without removing the casing from the wheel. Also the tire casing or tube may be inflated, gauged or deflated in a conventional manner.

Although a preferred embodiment of the invention has been disclosed, it is to be understood that changes in details of the tire valve construction may be resorted to within the range of mechanical skill without departing from the spirit of the invention as hereinafter claimed.

What I claim is:

1. A tire valve, for use with a tire having two air chambers one within the other, comprising a tubular spud and a tubular valve stem telescopically slidable and adjustable within the spud, said spud having a cylindrical smooth bore portion with ports in axial spaced relation leading from its bore, the valve stem having a radial port leading from its bore, means for axially positioning and holding the valve stem in the spud in either of two positions for establishing fluid communication between the port in the valve stem and a selected port in the spud, and a pair of O-ring packing means carried peripherally by the valve stem in axially spaced relation with one O-ring on either side of the axial port in said valve stem and slidably engaging the smooth wall of the bore of the spud to provide fluid-tight seals therewith and preclude fluid intercommunication between the axially spaced ports in the spud.

2. A tire valve according to claim 1, wherein the inner end of at least the spud or the valve stem is closed.

3. A tire valve according to claim 1, wherein the inner end of the bore of the valve stem is closed.

4. A tire valve according to claim 1, wherein the inner ends of the bores of both the spud and the valve stem are closed.

5. A tire valve for use with a tire having two air chambers one within the other, comprising a tubular spud and a tubular valve stem adjustable slidably within said spud, said spud having ports in axial spaced relation leading from its bore, the valve stem having a port leading from its bore, means for axially selectively positioning the valve stem in the spud for establishing fluid communication between the port in the valve stem and a selected port in the spud, said means comprising a shoulder on the spud, and a shoulder on the valve stem adapted for engagement with the shoulder on the spud, a removable spacer sleeve adapted for engagement with both said shoulders, and coupling means for holding said spud and said valve stem in either assembled relation, and packing means between the valve stem and the spud to provide fluid-tight seal therebetween.

6. A tire valve according to claim 5, wherein the valve stem has an annular flange, one face of which provides the shoulder for engagement with either the shoulder on the spud or the spacer sleeve and the other face of the flange provides an abutment for a part of the coupling means.

References Cited in the file of this patent

UNITED STATES PATENTS

| | | |
|---|---|---|
| 1,433,643 | Overlander | Oct. 31, 1922 |
| 2,481,404 | Donner | Sept. 6, 1949 |
| 2,549,075 | Fox | Apr. 17, 1951 |